United States Patent
Sivapuram et al.

(10) Patent No.: US 9,967,915 B2
(45) Date of Patent: May 8, 2018

(54) METHOD OF HANDLING MULTIPLE PDN/PDP DISCONNECTION REQUESTS ON THE SAME APN

(71) Applicant: Samsung Electronics Co., Ltd., Gyeonggi-do (KR)

(72) Inventors: Jaya Prakash Sivapuram, Bangalore (IN); Sailesh Kumar Giri, Surrey (GB); Ricky Kaura, Bangalore (IN)

(73) Assignee: Samsung Electronics Co., Ltd (KR)

( * ) Notice: Subject to any disclaimer, the term of this patent is extended or adjusted under 35 U.S.C. 154(b) by 60 days.

(21) Appl. No.: 15/149,958

(22) Filed: May 9, 2016

(65) Prior Publication Data

US 2016/0330792 A1 Nov. 10, 2016

(30) Foreign Application Priority Data

May 7, 2015 (IN) .......................... 2334/CHE/2015
Nov. 3, 2015 (IN) .......................... 2334/CHE/2015

(51) Int. Cl.
*H04W 4/00* (2018.01)
*H04W 76/06* (2009.01)
*H04W 68/00* (2009.01)
*H04W 76/02* (2009.01)

(52) U.S. Cl.
CPC ....... *H04W 76/064* (2013.01); *H04W 68/005* (2013.01); *H04W 76/062* (2013.01); *H04W 76/021* (2013.01)

(58) Field of Classification Search
CPC ............. H04W 76/064; H04W 76/062; H04W 68/005; H04W 76/021
See application file for complete search history.

(56) References Cited

U.S. PATENT DOCUMENTS

| 9,326,180 | B2 * | 4/2016 | Tanaka | H04W 28/0226 |
| 9,363,835 | B2 * | 6/2016 | Ronneke | H04W 76/02 |
| 9,713,057 | B2 * | 7/2017 | Horn | H04W 36/22 |
| 2010/0195493 | A1 * | 8/2010 | Hedman | H04L 63/1458 370/230 |
| 2011/0164566 | A1 * | 7/2011 | Xiong | H04W 76/062 370/328 |
| 2011/0176531 | A1 * | 7/2011 | Rune | H04W 76/041 370/338 |
| 2012/0082029 | A1 * | 4/2012 | Liao | H04W 76/025 370/230 |
| 2012/0094627 | A1 * | 4/2012 | Suh | H04W 4/22 455/404.1 |

(Continued)

FOREIGN PATENT DOCUMENTS

WO WO 2013/153021 10/2013

*Primary Examiner* — Clemence Han

(74) *Attorney, Agent, or Firm* — The Farrell Law Firm, P.C.

(57) ABSTRACT

A method of disconnecting a packet data network (PDN) connection or a packet data protocol (PDP) connection from an access point name (APN) by a user equipment (UE), including sending, to a network apparatus, a signaling message to request disconnecting the PDN connection or the PDP connection from the APN, wherein the signaling message includes an information element (IE), and receiving a deactivate request message from the network apparatus which deactivates the PDN connection or the PDP connection, in response to the signaling message.

16 Claims, 5 Drawing Sheets

(56) References Cited

U.S. PATENT DOCUMENTS

| | | | |
|---|---|---|---|
| 2012/0269167 A1* | 10/2012 | Velev | H04W 36/0011 |
| | | | 370/331 |
| 2014/0016614 A1* | 1/2014 | Velev | H04W 4/005 |
| | | | 370/331 |
| 2014/0051443 A1* | 2/2014 | Diachina | H04W 36/0022 |
| | | | 455/436 |
| 2015/0029999 A1* | 1/2015 | Horn | H04W 36/22 |
| | | | 370/331 |
| 2015/0098321 A1* | 4/2015 | Jeong | H04W 76/027 |
| | | | 370/230 |
| 2015/0215832 A1* | 7/2015 | Fitzpatrick | H04W 48/18 |
| | | | 455/426.1 |
| 2015/0296495 A1* | 10/2015 | Yasuda | H04W 16/32 |
| | | | 370/329 |
| 2015/0351136 A1* | 12/2015 | Kaura | H04W 76/064 |
| | | | 370/329 |
| 2016/0183156 A1* | 6/2016 | Chin | H04W 36/0022 |
| | | | 370/331 |
| 2016/0212795 A1* | 7/2016 | Chang | H04W 76/062 |
| 2017/0013512 A1* | 1/2017 | Bi | H04W 8/082 |
| 2017/0188275 A1* | 6/2017 | Kim | H04W 76/025 |
| 2017/0223521 A1* | 8/2017 | Jeong | H04W 8/005 |
| | | | 455/411 |

* cited by examiner

METHOD OF HANDLING MULTIPLE PDN/PDP DISCONNECTION REQUESTS ON THE SAME APN

PRIORITY

This application claims priority under 35 U.S.C. § 119(a) to an Indian Provisional Patent Application filed on May 7, 2015 in the Indian Intellectual Property Office and assigned Serial No. 2334/CHE/2015 (PS), and an Indian Complete Patent Application filed on Nov. 3, 2015 in the Indian Intellectual Property Office and assigned Serial No. 2334/CHE/2015 (CS), the entire contents of each of which are incorporated herein by reference.

BACKGROUND

1. Field of the Disclosure

The present disclosure relates generally to wireless communication systems, and more particularly, to a method of handling multiple packet data network/packet data protocol (PDN/PDP) disconnection requests on a same access point name (APN).

2. Description of the Related Art

According to the third generation partnership project (3GPP), a user equipment/mobile station (UE/MS) may have multiple PDN/PDP connections (i.e., multiple default bearers) on a same APN. When a UE/MS requests a PDN/PDP connection with a PDN/PDP type as dual stack internet protocol (IP) version 4 and IP version 6 (IPv4v6), the network accept only one IP version. In this case a UE/MS may request a new PDN/PDP connection with a non-accepted PDN/PDP type (e.g., IPv4). So, two default/primary bearers may be established on the same APN but with different PDN/PDP types.

During PDN/PDP disconnection, if 2 bearers are active, a UE/MS will first send a PDN/PDP disconnection request for the first connection and a separate PDN/PDP disconnection request for the second connection. In this case, the UE/MS must send a PDN/PDP disconnection request for each of the existing PDN/PDP connections on the APN, which is inefficient, because it requires separate PDN/PDP disconnection requests.

According to the 3GPP if the UE/MS requests PDN type IPv4v6, but the operator uses single addressing per bearer, the network will override the PDN type requested by the UE/MS to a single IP version only, and the UE/MS must request another PDN connection for the other IP version.

SUMMARY

An aspect of the present disclosure provides a method of handling multiple PDN/PDP disconnection requests on the same APN.

In accordance with an aspect of the present disclosure, a method of disconnecting a packet data network (PDN) connection or a packet data protocol (PDP) connection from an access point name (APN) by a user equipment is provided. The method includes sending, to a network apparatus, a signaling message to request disconnecting the PDN connection or the PDP connection from the APN, wherein the signaling message includes an information element (IE); and receiving a deactivate request message from the network apparatus which deactivates the PDN connection or the PDP connection, in response to the signaling message.

In accordance with another aspect of the present disclosure, a user equipment for disconnecting a packet data network (PDN) connection or a packet data protocol (PDP) connection from an access point name (APN) is provided. The user equipment includes a processor configured to: send, to a network apparatus, a signaling message to request disconnecting the PDN connection or the PDP connection from the APN, wherein the signaling message includes an information element (IE); and receive a deactivate request message from the network apparatus which deactivates the PDN connection or the PDP connection, in response to the signaling message.

In accordance with another aspect of the present disclosure, a method of disconnecting a packet data network (PDN) connection and a packet data protocol (PDP) connection from an access point name (APN) by a network apparatus is provided. The method includes receiving a signaling message from a user equipment (UE) to disconnect a PDN connection or a PDP connection from the APN, wherein the signaling message includes an information element (IE); and disconnecting the PDN connection or PDP connection from the APN based on the signaling message.

BRIEF DESCRIPTION OF THE DRAWINGS

The above and other aspects, features, and advantages of the present disclosure will be more apparent from the following description, taken in conjunction with the accompanying drawings in which.

DETAILED DESCRIPTION OF EMBODIMENTS OF THE PRESENT DISCLOSURE

Figure 1:
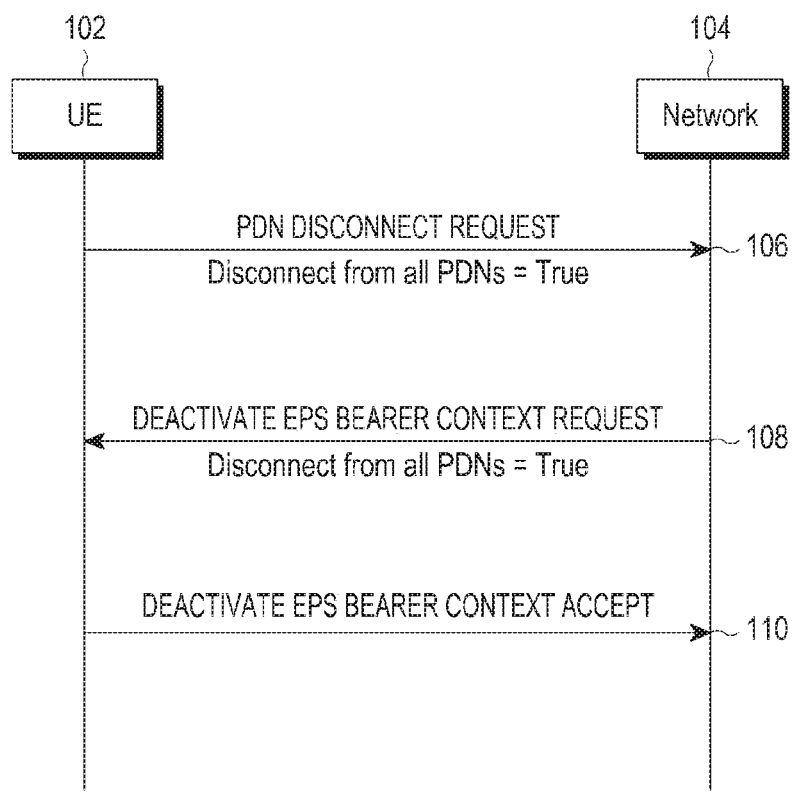
FIG. 1 is a flow diagram of a network accepting multiple PDN disconnections on the same APN for a long term evolution (LTE) network, according to an embodiment of the present disclosure.

The present disclosure provides a method of handling multiple PDN/PDP disconnection requests on the same APN. In the following detailed description of the embodiments of the present disclosure, reference is made to the accompanying drawings that form a part hereof, and in which are shown by way of illustration certain embodiments in which the present disclosure may be practiced. These embodiments are described in sufficient detail to enable those skilled in the art to practice the present disclosure, and it is to be understood that other embodiments may be utilized and that changes may be made without departing from the scope and spirit of the present disclosure. The following detailed description is, therefore, not to be taken in a limiting sense, and the scope of the present disclosure is defined by the appended claims and their equivalents.

Although certain features of the present disclosure are shown in some of the accompanying drawings and not in others, this is done for convenience only as each feature may be combined with any or all of the other features in accordance with the present disclosure.

The specification may refer to "an," "one" or "some" embodiment(s) in several locations. This does not necessarily imply that each such reference is to the same embodiment(s), or that the feature only applies to a single embodiment. Single features of different embodiments may also be combined to provide other embodiments.

Herein, the singular forms "a," "an" and "the" are intended to include the plural forms as well, unless expressly stated otherwise. Terms "includes," "comprises," "including" and/or "comprising" when used in the present specification, indicate the presence of stated features, integers, steps, operations, elements and/or components, but do not preclude the presence or addition of one or more other features integers, steps, operations, elements, components, and/or groups thereof. The term "and/or" includes any and all combinations and arrangements of one or more of the associated listed items.

Unless otherwise defined, all terms used herein have the same meanings as commonly understood by one of ordinary skill in the art to which the present disclosure pertains. Terms, such as those defined in commonly used dictionaries, should be interpreted as having meanings that are consistent with their meanings in the context of the relevant art and should not be interpreted in an idealized or overly formal sense unless expressly so defined herein.

The present disclosure provides a method of handling multiple PDN/PDP disconnection requests on the same APN. The herein below described method of handling PDN/PDP disconnection requests has been described with respect to a UE. However, a request for disconnecting all PDN/PDP connections may be received by a mobile station (MS) handling one or more UEs present within its coverage region, without departing from the scope or spirit of the present disclosure.

According to an embodiment of the present disclosure, a method of handling PDN/PDP disconnection requests from a UE having multiple connections with a single APN is described herein. According to the present disclosure, the method includes a step of receiving, by a network, a signaling request message from the UE user to disconnect all PDN/PDP connections for the APN, wherein the signaling request includes an information element (IE). The UE may have one or more PDN or PDP connections with one or more bearers over an APN. When the UE wants to disconnect from all PDN/PDP connections, then the UE may transmit the signal request message to the network to disconnect all the PDN/PDP connections with the APN. The network may receive the signaling request message from the UE for disconnecting all the PDN/PDP connections, wherein the signaling request includes an IE.

According to an embodiment of the present disclosure the signaling message includes one of a PDN DISCONNECT REQUEST message and a DEACTIVATE PDP CONTEXT REQUEST message. The IE is at least one of a Boolean IE and an additional bearer entity IE.

According to an embodiment of the present disclosure, the Boolean IE includes an indication of a disconnection from one or more PDNs in an LTE network, and a disconnection from one or more PDPs in a UMTS network. The additional IE is one of, but is not limited to, a linked default EPS bearer identity in an LTE network, a linked transaction identifier for a UMTS network, and the like.

According to an embodiment of the present disclosure, the network validates values in the linked default EPS bearer identity if the EPS bearer identity in the linked EPS bearer identity IE and linked default EPS bearer identity IE belongs to the same APN, both EPS bearer identity values do not belong to the same APN, then the network may disconnect only a bearer identity in the linked EPS bearer identity IE, and the value of the EPS bearer identity is in a preset value range.

According to an embodiment of the present disclosure, the network validates values present in the linked transaction identifier if a netscape server application programming interface (NSAPI) value present in linked transaction identifier IE and a transaction identifier IE belong to the same APN, If both linked transaction identifier IE and a transaction identifier IE values belong to same APN, and the value is in a preset NSAPI value range.

According to an embodiment of the present invention, the network disconnects only the NSAPI present in transaction identifier IE if both the linked transaction identifier IE and the transaction identifier IE values do not belong to the same APN and the value present in the linked transaction identifier is ignored. The UE may send a separate signaling message for disconnecting a non-accepted PDN and a non-accepted PDP, if the IE is not set to true.

In an embodiment of the present disclosure, the signaling request message may be one of, but not limited to, a PDN DISCONNECT REQUEST message, a DEACTIVATE PDP CONTEXT REQUEST message, and the like. A PDN DISCONNECT REQUEST message, and a DEACTIVATE PDP CONTEXT REQUEST messages are the standard messages for disconnecting a PDN/PDP connection, and a person having ordinarily skilled in the art can understand the function, and message structure of the PDN DISCONNECT REQUEST message, and the DEACTIVATE PDP CONTEXT REQUEST messages, and hence are not described in detail.

In an embodiment of the present disclosure, an IE may be at least one of, but is not limited to, a Boolean IE, an additional bearer entity IE, and the like. A Boolean IE may include an indication to disconnect from one or more PDNs for an LTE network. A Boolean IE may include an indication to disconnect from one or more PDPs for a UMTS network. An additional IE is one of a linked default EPS bearer identity for an LTE network. An additional IE may be one of a linked transaction identifier for a UMTS network.

Further, an embodiment of the present disclosure may include checking whether an IE is set in a signaling request message. Upon receiving a signaling request message along with an IE, the network may validate whether the IE is being set or not.

In an embodiment of the present disclosure, the network validates values present in the linked default EPS bearer identity for an LTE network if the EPS bearer identity present in the linked EPS bearer identity IE and the linked default EPS bearer identity IE belongs to the same APN. If both EPS bearer identity values do not belong to the same APN, then the network may disconnect only the bearer identity present in the linked EPS bearer identity IE, if the value of the EPS bearer identity is in a preset value range.

In an embodiment of the present disclosure, the network validates values present in the linked transaction identifier for a UMTS network if a netscape server application programming interface (NSAPI) value present in a linked transaction identifier IE and a transaction identifier IE belong to the same APN, if both the linked transaction identifier IE and a transaction identifier IE belong to the same APN, and there values are in a preset NSAPI value range.

Further, an embodiment of the present disclosure may disconnect, by the network, one or more PDN/PDP connections from the APN if the IE is set without requiring an additional request message from the UE to disconnect the PDN/PDP connections. Upon validating that the IE is being set, the network may disconnect all the existing PDN/PDP connections for the APN of the UE. To disconnect all the PDN/PDP connections, the UE need not send any additional messages to the network, and all the existing PDN/PDP connections to the APN may be disconnected by setting up an IE in the signaling request message.

In an embodiment of the present disclosure, the network disconnects only the NSAPI present in a transaction identifier IE if both a linked transaction identifier IE and a transaction identifier IE do not belong to the same APN, and their values present in the linked transaction identifier are ignored.

According to the present disclosure, if an IE is not set in a signaling request message, a UE may send a separate signaling message for disconnecting non-accepted PDNs and non-accepted PDPs.

The present disclosure enables a network to identify PDN/PDP connections for an APN of a UE. If a user of a UE wants to disconnect all PDN/PDP connections, then an IE present in a signaling request message may be set and sent to the network. The network may receive the signaling request message along with the IE and validate whether the IE is being set or not.

If the IE is set, then the network may disconnect all the existing PDN/PDP connections for the APN of the UE. If the IE is not set, then the UE must send separate messages to the network to disconnect all the PDN/PDP connections.

According to an embodiment of the present disclosure, a signaling request message along with an IE may be transmitted by an MS to a network, wherein the MS may include one or more UEs within its coverage region. Based on the signaling request message along with the IE received, the network may connect all the PDN/PDP connections for an APN of the MS. If all the PDN/PDP connections of the MS are disconnected, then PDN/PDP connections of all the UEs present in the MS are also disconnected from the APN, thereby not requiring the transmission of either a signaling request message or PDN/PDP disconnection request message by individual UEs of an MS.

FIG. 1 is a flow diagram of a network 104 (or a network apparatus) accepting multiple PDN disconnections on the same APN for an LTE network, according to an embodiment of the present disclosure. The flow diagram depicts communication between a UE 102 and the network 104 over an LTE network, where the UE 102 may transmit a Boolean IE in a signaling request message to disconnect from all PDNs.

Referring to FIG. 1, in step 106, the UE 102 transmits a PDN DISCONNECT REQUEST message to the network 104, wherein the Boolean IE is set as true, which indicates that the UE wants to disconnect from all the PDNs. In the network 104, multiple PDNs are active on a first APN (e.g., an APN1) for the UE 102. The Boolean IE may be set as true by setting a Boolean value to 1 and the Boolean IE may be set as false by setting the Boolean value to 0. The Boolean values may be used to set whether to disconnect all PDNs or not.

Upon receiving the PDN DISCONNECT REQUEST message along with the IE set as true, the network 104 identifies that the Boolean IE is set as true, which indicates that all the PDNs associated with the APN are to be deactivated. Based on the set Boolean IE, in step 108, the network 104 transmits a DEACTIVATE EPS BEARER CONTEXT REQUEST message to the UE 102, wherein the network 104 has set the IE for disconnecting from all the PDNs as true to indicate that the network 104 has identified the Boolean IE transmitted by the UE 102 and the network 104 has disconnected all the PDNs. Upon receiving the DEACTIVATE EPS BEARER CONTEXT REQUEST message from the network 104, in step 110, the UE 102 may transmit a DEACTIVATE EPS BEARER CONTEXT ACCEPT message to the network 104 and disconnect from all the PDNs of the APN.

If the network 104 identifies that the Boolean IE is not set as true, then the network 104 may transmit a DEACTIVATE EPS BEARER CONTEXT REQUEST along with setting the IE for disconnecting from all the PDNs as false, indicating that the network 104 cannot disconnect all the PDNs of the APN from the UE. Therefore, in this case, the UE 102 must transmit separate PDN DISCONNECT REQUEST messages for the non-accepted PDN type.

The structure for the PDN DISCONNECT REQUEST message is as follows in Table 1.

TABLE 1

| IEI | Information Element | Type/Reference | Presence | Format | Length |
|---|---|---|---|---|---|
| | Protocol discriminator | Protocol discriminator 9.2 | M | V | ½ |
| | EPS bearer identity | EPS bearer identity 9.3.2 | M | V | ½ |
| | Procedure transaction identity | Procedure transaction identity 9.4 | M | V | 1 |
| | PDN disconnect request message identity | Message type 9.8 | M | V | 1 |
| | Linked EPS bearer identity | Linked EPS bearer identity 9.9.4.6 | M | V | ½ |
| | Disconnect from all PDNs | Disconnect from all PDNs 9.9.4.18 | M | V | ½ |
| 27 | Protocol configuration options | Protocol configuration options 9.9.4.11 | O | TLV | 3-253 |

The structure for the DEACTIVATE EPS BEARER CONTEXT REQUEST message is as follows in Table 2.

TABLE 2

| IEI | Information Element | Type/Reference | Presence | Format | Length |
|---|---|---|---|---|---|
| | Protocol discriminator | Protocol discriminator 9.2 | M | V | ½ |
| | EPS bearer identity | EPS bearer identity 9.3.2 | M | V | ½ |
| | Procedure transaction identity | Procedure transaction identity 9.4 | M | V | 1 |
| | Deactivate EPS bearer context request message identity | Message type 9.8 | M | V | 1 |
| | ESM cause | ESM cause 9.9.4.4 | M | V | 1 |
| | Disconnect from all PDNs | Disconnect from all PDNs 9.9.4.18 | M | V | ½ |
| | Spare Octet | Spare half octet 9.9.2.9 | M | V | ½ |
| 27 | Protocol configuration options | Protocol configuration options 9.9.4.11 | O | TLV | 3-253 |
| 37 | T3396 value | GPRS timer 3 9.9.3.16B | O | TLV | 3 |

Figure 2:
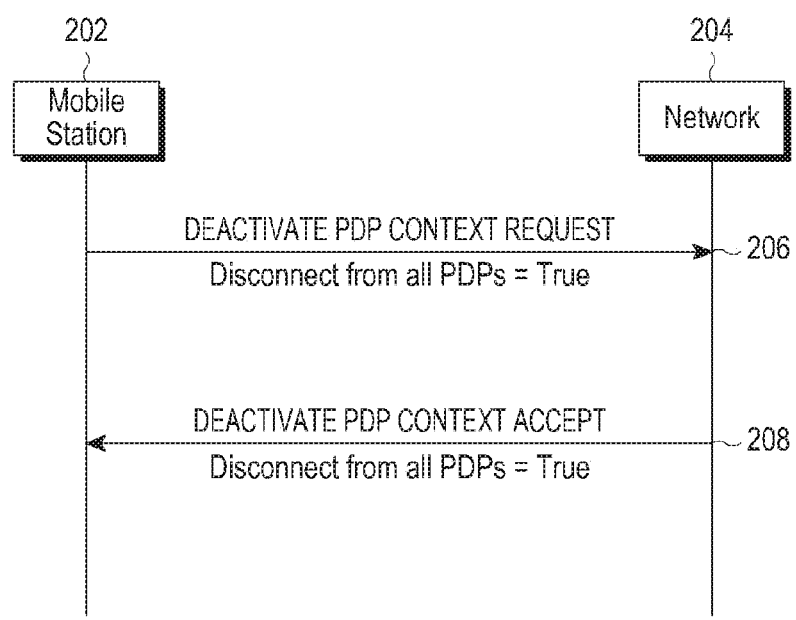
FIG. 2 is a flow diagram of a network accepting multiple PDP disconnections on the same APN for universal mobile telecommunications system (UMTS) network, according to an embodiment of the present disclosure.

FIG. 2 is a flow diagram of a network 204 (or a network apparatus) accepting multiple PDP disconnections on the same APN for a UMTS network, according to an embodiment of the present disclosure. The flow diagram depicts communication between an MS 202 and the network 204 over a UMTS network, wherein the MS 202 may transmit a Boolean IE in a signaling request message to disconnect from all PDPs.

Referring to FIG. 2, in step 206, the MS 202 transmits a DEACTIVATE PDP CONTEXT REQUEST message to the network 204, wherein the Boolean IE is set as true, which indicates that the MS 202 wants to disconnect from all the PDPs. At the network 204, multiple PDPs are active on a first APN (e.g., an APN1) for the MS 202. The Boolean IE may be set as true by setting a Boolean value to 1 and the Boolean IE may be set as false by setting the Boolean value to 0. The Boolean values may be used to set whether to disconnect all PDPs or not.

Upon receiving the DEACTIVATE PDP CONTEXT REQUEST message along with the IE set as true, the network 204 identifies that the Boolean IE is set as true, which indicates that all the PDPs associated with the APN must be deactivated. Based on the Boolean IE set as true, in step 208, the network 204 transmits a DEACTIVATE PDP CONTEXT ACCEPT message to the MS 202, wherein the network 204 has set the IE for disconnecting from all the PDPs as true, indicating that the network 204 has identified the Boolean IE transmitted by the MS 202 is set to true and the network 204 has disconnected all the PDPs.

If the network 204 identifies that the Boolean IE has not been set to true, then the network 204 may transmit a DEACTIVATE PDP CONTEXT ACCEPT message along with setting the IE for disconnecting from all the PDPs as false, indicating that the network 204 cannot disconnect all the PDPs of the APN from the MS 202. Therefore, in this case, the MS 202 must transmit a separate DEACTIVATE PDP CONTEXT REQUEST message for the non-accepted PDP type.

The structure for a DEACTIVATE PDP CONTEXT REQUEST message is as follows in Table 3.

TABLE 3

| IEI | Information Element | Type/Reference | Presence | Format | Length |
|---|---|---|---|---|---|
| | Protocol discriminator | Protocol discriminator 10.2 | M | V | ½ |
| | Transaction identifier | Transaction identifier 10.3.2 | M | V | ½-3/2 |
| | Deactivate PDP context request message identity | Message type 10.4 | M | V | 1 |
| | SM cause | SM cause 10.5.6.6 | M | V | 1 |
| | Disconnect from all PDPs | Disconnect from all PDPs 10.5.6.7 | M | V | ½ |
| | Spare Octet | Spare half octet 10.5.1.8 | M | V | ½ |
| 9- | Tear down indicator | Tear down indicator 10.5.6.10 | O | TV | 1 |
| 27 | Protocol configuration options | Protocol configuration options 10.5.6.3 | O | TLV | 3-253 |
| 35 | MBMS protocol configuration options | MBMS protocol configuration options 10.5.6.15 | O | TLV | 3-253 |

The structure for a DEACTIVATE PDP CONTEXT ACCEPT message is as follows Table 4.

TABLE 4

| IEI | Information Element | Type/Reference | Presence | Format | Length |
|---|---|---|---|---|---|
| | Protocol discriminator | Protocol discriminator 10.2 | M | V | ½ |
| | Transaction identifier | Transaction identifier 10.3.2 | M | V | ½-3/2 |
| | Deactivate PDP context accept message identity | Message type 10.4 | M | V | 1 |
| | Disconnect from all PDPs | Disconnect from all PDPs 10.5.6.7 | M | V | ½ |
| | Spare Half Octet | Spare half octet 10.5.1.8 | M | V | ½ |
| 27 | Protocol configuration options | Protocol configuration options 10.5.6.3 | O | TLV | 3-253 |
| 35 | MBMS protocol configuration options | MBMS protocol configuration options 10.5.6.15 | O | TLV | 3-253 |

The flow diagram is described above with respect to an MS, wherein the MS transmits a request message along with a Boolean IE to disconnect PDPs. Thus, all the PDPs are disconnected by the network 204 for all UEs present in the coverage region of the MS. One or more UEs may separately transmit request messages to the network 204 to disconnect all PDPs.

The herein abovementioned figures describe using a Boolean value as an IE in the signal request messages for disconnecting all PDNs/PDPs. In an embodiment of the present disclosure, a linked default EPS bearer identity may be used as an IE for disconnecting all PDNs from the UE/MS. The IE indicates that a linked default EPS bearer identity must be disconnected along with the linked EPS bearer identity. The value present in the linked default EPS Bearer identity may be considered valid if the below conditions are met:

EPS bearer identity present in the linked EPS bearer identity IE and the linked default EPS bearer identity IE should belong to the same APN; if both EPS bearer identity values do not belong to the same APN, then the network 204 may disconnect only the bearer identity present in the linked EPS bearer identity IE, where the value present in the linked default EPS bearer identity may be ignored; and the value should be a valid EPS bearer identity value, e.g., any value in the range 5-11 is treated as valid. All other values are treated as invalid and may be ignored when received.

When accepted, the network 204 should deactivate the linked default EPS bearer identity locally.

Figure 3:
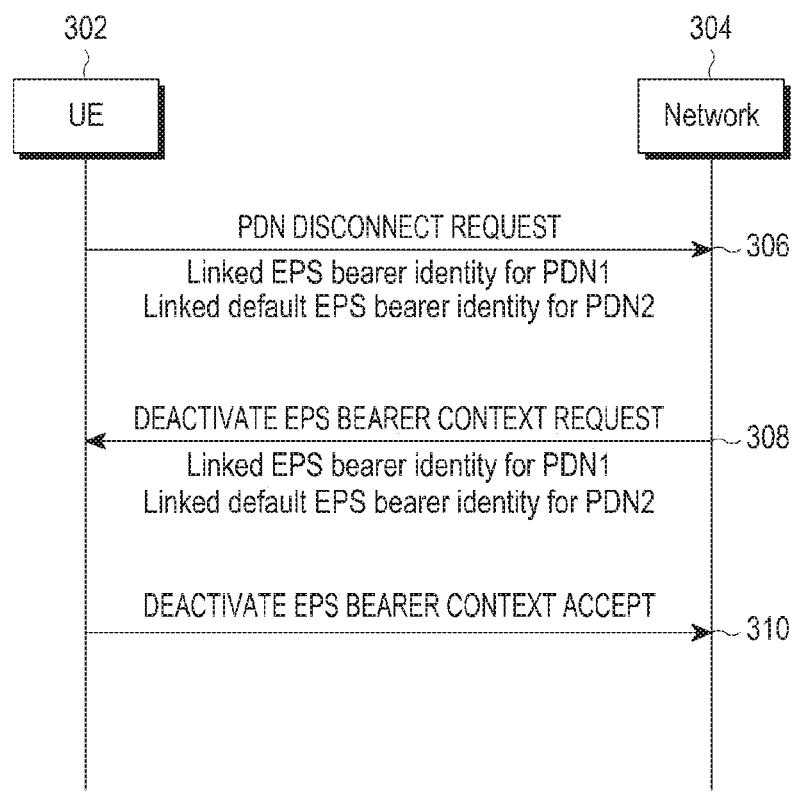
FIG. 3 is a flow diagram of a network accepting multiple PDN disconnections on the same APN for an LTE network, according to an embodiment of the present disclosure.

FIG. 3 is a flow diagram of a network 304 (or a network apparatus) accepting multiple PDN disconnections on the same APN for an LTE network, according to an embodiment of the present disclosure. The flow diagram depicts communication between a UE 302 and the network 304 over an LTE network, wherein the UE 302 may transmit a linked default EPS bearer identity as an IE in a signaling request message to disconnect from all PDNs.

Referring to FIG. 3, in step 306, the UE 302 transmits a PDN DISCONNECT REQUEST message to the network 304, wherein the IE includes a linked EPS bearer identity for a first PDN (e.g., a PDN1) and a linked default EPS bearer identity for a second PDN (e.g., a PDN2), which indicates that the UE 302 wants to disconnect from PDN2. In the network 304, PDN1 and PDN2 are active on a first APN (e.g., an APN1) for the UE 302. The IE may be set to a predetermined value, wherein the predetermined value refers to a certain PDN from which the UE 302 wants to disconnect.

Upon receiving the PDN DISCONNECT REQUEST along with the IE, the network 304 identifies the linked default EPS bearer identity present in the IE belongs to PDN2, which indicates that the PDN2 associated with the APN must be deactivated. Based on the set IE, in step 308, the network 304 transmits a DEACTIVATE EPS BEARER CONTEXT REQUEST message to the UE 302 along with an IE, wherein the IE includes a linked EPS bearer identity for PDN1 and a linked default EPS bearer identity for PDN2 for disconnecting UE 302 from PDN2. Upon receiving the DEACTIVATE EPS BEARER CONTEXT REQUEST message from the network 304, in step 310, the UE 302 may transmit a DEACTIVATE EPS BEARER CONTEXT ACCEPT message to the network 304 and disconnect from all the PDNs of the APN.

If the network 304 identifies that the value included in the IE for the certain PDN sent in the PDN DISCONNECT REQUEST message and the DEACTIVATE EPS BEARER CONTEXT REQUEST message do not match, then the UE 302 must transmit a PDN DISCONNECT REQUEST message for PDN2 again.

The structure for a PDN DISCONNECT REQUEST message is as follows in Table 5.

TABLE 5

| IEI | Information Element | Type/Reference | Presence | Format | Length |
|---|---|---|---|---|---|
| | Protocol discriminator | Protocol discriminator 9.2 | M | V | ½ |
| | EPS bearer identity | EPS bearer identity 9.3.2 | M | V | ½ |
| | Procedure transaction identity | Procedure transaction identity 9.4 | M | V | 1 |
| | PDN disconnect request message identity | Message type 9.8 | M | V | 1 |
| | Linked EPS bearer identity | Linked EPS bearer identity 9.9.4.6 | M | V | ½ |

TABLE 5-continued

| IEI | Information Element | Type/Reference | Presence | Format | Length |
|---|---|---|---|---|---|
| | Linked Default EPS bearer identity | Linked EPS bearer identity 9.9.4.18 | M | V | ½ |
| 27 | Protocol configuration options | Protocol configuration options 9.9.4.11 | O | TLV | 3-253 |

The structure for a DEACTIVATE EPS BEARER CONTEXT REQUEST message is as follows in Table 6.

TABLE 6

| IEI | Information Element | Type/Reference | Presence | Format | Length |
|---|---|---|---|---|---|
| | Protocol discriminator | Protocol discriminator 9.2 | M | V | ½ |
| | EPS bearer identity | EPS bearer identity 9.3.2 | M | V | ½ |
| | Procedure transaction identity | Procedure transaction identity 9.4 | M | V | 1 |
| | Deactivate EPS bearer context request message identity | Message type 9.8 | M | V | 1 |
| | ESM cause | ESM cause 9.9.4.4 | M | V | 1 |
| | Linked Default EPS bearer identity | Linked EPS bearer identity (9.9.4.18) | M | V | ½ |
| | Spare Octet | Spare half octet 9.9.2.9 | M | V | ½ |
| 27 | Protocol configuration options | Protocol configuration options 9.9.4.11 | O | TLV | 3-253 |
| 37 | T3396 value | GPRS timer 3 9.9.3.16B | O | TLV | 3 |

In an embodiment of the present disclosure, a linked transaction identifier may be used as an IE for disconnecting all PDPs from a UE/MS. The IE may indicate a NSAPI that must be disconnected along with a transaction identifier IE. A value present in a linked transaction identifier is considered valid if the below conditions are met: the NSAPI value present in the linked transaction identifier IE and the transaction identifier IE should belong to the same APN; if both the linked transaction identifier IE value and the transaction identifier IE value do not belong to the same APN, then the network 304 may only disconnect the NSAPI present in the transaction identifier IE, where the value present in the linked transaction identifier may be ignored; and the value should be a valid NSAPI value, e.g., any value in the range 5-11 may be treated as valid, where all other values are treated as invalid and may be ignored when received.

When accepted, the network 304 should deactivate the linked transaction identity locally.

Figure 4:
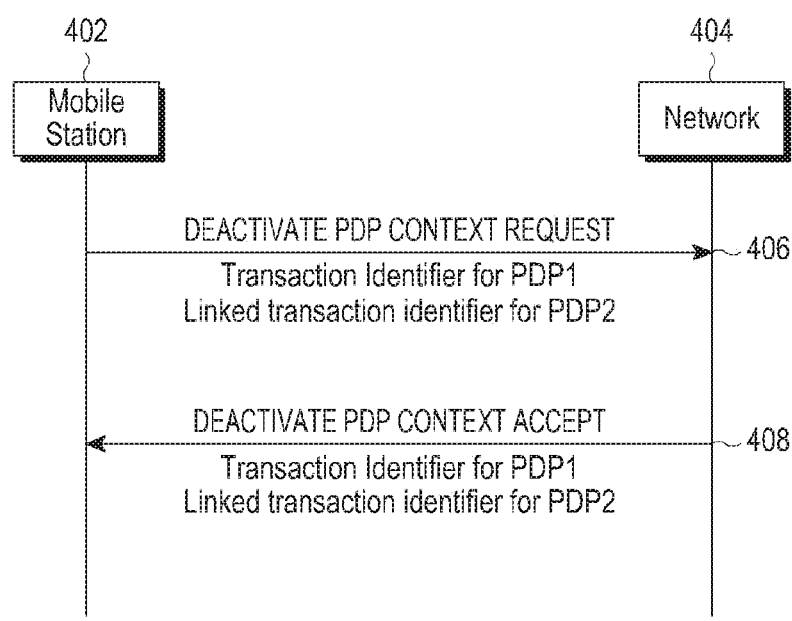
FIG. 4 is a flow diagram of a network accepting multiple PDP disconnections on the same APN for a UMTS network, according to an embodiment of the present disclosure.

FIG. 4 is a flow diagram of a network 404 (or a network apparatus) accepting multiple PDP disconnections on the same APN for a UMTS network, according to an embodiment of the present disclosure. The flow diagram depicts communication between an MS 402 and the network 404 over a UMTS network, wherein the MS 402 may transmit a linked transaction identifier as an IE in a signaling request message to disconnect from all PDPs.

Referring to FIG. 4, in step 406, the MS 402 transmits a DEACTIVATE PDP CONTEXT REQUEST message to the network 404, wherein the IE includes a transaction identifier for a first PDP (e.g., a PDP1) and linked transaction identifier for a second PDP (e.g., a PDP2), which indicates that UE 402 wants to disconnect from PDP2. In the network 404, PDP1 and PDP2 are active on a first APN (e.g., an APN1) for the MS 402. A predetermined value may be set to the IE, wherein the predetermined value refers to a certain PDP from which the UE 402 wants to disconnect.

Upon receiving the DEACTIVATE PDP CONTEXT REQUEST message along with the IE, the network 404 identifies the linked transaction identifier present in the IE belongs to the PDP2, which indicates that the PDP2 associated with the APN1 must be deactivated. Based on the linked transaction identifier present in the IE, in step 408, the network 404 transmits a DEACTIVATE PDP CONTEXT ACCEPT message to the MS 402, wherein the network 404 has set the IE for disconnecting from the PDP2 and, thus, the network 404 disconnects the PDP2 from the MS 402.

If the network 404 identifies that the value included in the IE for the PDP2 sent in the DEACTIVATE PDP CONTEXT REQUEST message and the DEACTIVATE PDP CONTEXT ACCEPT message do not match, then the UE 402 must transmit a PDP DISCONNECT REQUEST message for the PDP2 again.

The structure for a DEACTIVATE PDP CONTEXT REQUEST message is as follows in Table 7.

TABLE 7

| IEI | Information Element | Type/Reference | Presence | Format | Length |
|---|---|---|---|---|---|
| | Protocol discriminator | Protocol discriminator 10.2 | M | V | ½ |

TABLE 7-continued

| IEI | Information Element | Type/Reference | Presence | Format | Length |
|---|---|---|---|---|---|
|  | Transaction identifier | Transaction identifier 10.3.2 | M | V | ½-½ |
|  | Deactivate PDP context request message identity | Message type 10.4 | M | V | 1 |
|  | SM cause | SM cause 10.5.6.6 | M | V | 1 |
|  | Linked Transaction identifier | Transaction identifier 10.5.6.7 | M | LV | 2-3 |
| 9- | Tear down indicator | Tear down indicator 10.5.6.10 | O | TV | 1 |
| 27 | Protocol configuration options | Protocol configuration options 10.5.6.3 | O | TLV | 3-253 |
| 35 | MBMS protocol configuration options | MBMS protocol configuration options 10.5.6.15 | O | TLV | 3-253 |

The structure for a DEACTIVATE PDP CONTEXT ACCEPT message is as follows in Table 8.

TABLE 8

| IEI | Information Element | Type/Reference | Presence | Format | Length |
|---|---|---|---|---|---|
|  | Protocol discriminator | Protocol discriminator 10.2 | M | V | ½ |
|  | Transaction identifier | Transaction identifier 10.3.2 | M | V | ½-½ |
|  | Deactivate PDP context accept message identity | Message type 10.4 | M | V | 1 |
|  | Linked Transaction identifier | Transaction identifier 10.5.6.7 | M | LV | 2-3 |
| 27 | Protocol configuration options | Protocol configuration options 10.5.6.3 | O | TLV | 3-253 |
| 35 | MBMS protocol configuration options | MBMS protocol configuration options 10.5.6.15 | O | TLV | 3-253 |

The flow diagram is described above with respect to an (MS), wherein the MS transmits a request message along with an IE to disconnect from certain PDPs. Thus, the certain PDPs are disconnected by the network 404 for all UEs present in the coverage region of the MS. In One or more UEs may separately transmit request messages to the network 404 to disconnect certain PDPs.

Figure 5:
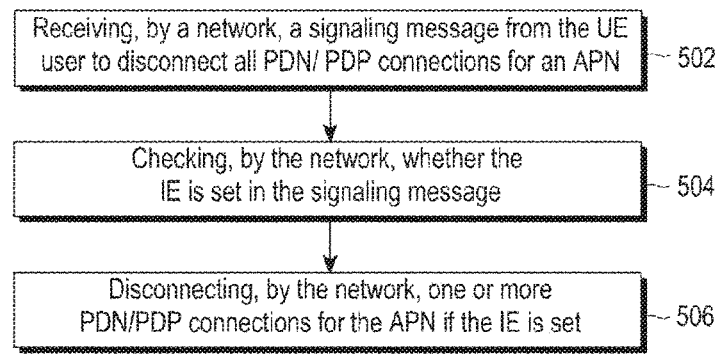
FIG. 5 is a flowchart of a method of handling PDN/PDP disconnection requests from a UE having multiple connections with a single APN, according to an embodiment of the present disclosure.

FIG. 5 is a flowchart of a method of handling packet data network/packet data protocol (PDN/PDP) disconnection requests from a UE having multiple connections with a single APN, according to an embodiment of the present disclosure.

Referring to FIG. 5, in step 502, a network receives a signaling message from a UE user to disconnect all PDN/PDP connections for an APN, wherein the signaling request includes an IE. Further, in step 504, the network checks whether the IE is set in the signaling message. Further, in step 506, the network disconnects one or more PDN/PDP connections from the APN if the IE is set, without requiring an additional request message from the UE to disconnect the PDN/PDP connections.

The MS, UE and network (or network apparatus) of the present disclosure may comprise respectively a processor (or a controller) and a transceiver. It may be construed that the each processor of the MS, UE and network controls all of the operations described herein to be performed.

The present disclosure is described above with reference to certain embodiments; it will be evident that various modifications and changes may be made to these embodiments without departing from the spirit and scope of the present disclosure. Furthermore, the various devices, modules, and the like described herein may be enabled and operated using hardware circuitry, for example, complementary metal oxide semiconductor based logic circuitry, firmware, software and/or any combination of hardware, firmware, and/or software embodied in a machine readable medium. For example, various electrical structures and methods may be embodied using transistors, logic gates, and electrical circuits, such as an application specific integrated circuit.

Although the present disclosure is described with reference to various embodiments, it will be obvious for a person skilled in the art to practice the present disclosure with modifications. However, all such modifications are intended to be within the scope of the present disclosure, as defined by the appended claims and their equivalents.

What is claimed is:

1. A method of disconnecting a plurality of packet data network (PDN) connections from an access point name (APN) by a user equipment (UE), comprising:
   transmitting, to a network apparatus, a signaling message including an information element (IE), wherein the IE comprises a linked evolved packet system (EPS) bearer identity indicating a disconnection of a first PDN associated with the APN and a linked default EPS bearer identity indicating a disconnection of a second PDN associated with the APN; and
   receiving, from the network apparatus, a deactivate request message for disconnecting the UE from the first PDN and the second PDN, in response to the signaling message; and
   disconnecting the first PDN and the second PDN associated with the APN.

2. The method of claim 1, wherein the signaling message comprises a PDN disconnect request message.

3. The method of claim 1, wherein the IE is at least one of a Boolean IE and an additional bearer entity IE.

4. The method of claim 3, wherein the Boolean IE comprises an indication to:
    disconnect from the first PDN and the second PDN for a long term evolution (LTE) network.

5. The method of claim 3, wherein the additional bearer entity IE is:
    the linked default EPS bearer identity for a long term evolution (LTE) network.

6. The method of claim 5, wherein a value of the linked default EPS bearer identity is in a preset value range.

7. The method of claim 1, further comprising:
    transmitting, to the network apparatus, a deactivate accept message representing that the user equipment disconnects the first PDN and the second PDN.

8. A user equipment (UE) for disconnecting a plurality of packet data network (PDN) connections from an access point name (APN), configured to:
    a processor configured to:
    transmit, to a network apparatus, a signaling message including an information element (IE), wherein the IE comprises a linked evolved packet system (EPS) bearer identity indicating a disconnection of a first PDN associated with the APN and a linked default EPS bearer identity indicating a disconnection of a second PDN associated with the APN; and
    receive, from the network apparatus, a deactivate request message for disconnecting the UE from the first PDN and the second PDN, in response to the signaling message; and
    disconnect the first PDN and the second PDN associated with the APN.

9. The UE of claim 8, wherein the signaling message comprises a PDN disconnect request message.

10. The UE of claim 8, wherein the IE is at least one of a Boolean IE and an additional bearer entity IE.

11. The UE of claim 10, wherein the Boolean IE comprises an indication to:
    disconnect from the first PDN and the second PDN for a long term evolution (LTE) network.

12. The UE of claim 10, wherein the additional bearer entity IE is the linked default EPS bearer identity for a long term evolution (LTE) network.

13. The UE of claim 12, wherein a value of the linked default EPS bearer identity is in a preset value range.

14. The UE of claim 8, the processor configured to:
    transmit, to the network apparatus, a deactivate accept message representing that the user equipment disconnects the first PDN and the second PDN.

15. A method of disconnecting a plurality of packet data network (PDN) connections from an access point name (APN) by a network apparatus, comprising:
    receiving, from a user equipment a signaling message including an information element (IE), wherein the IE comprises a linked evolved packet system (EPS) bearer identity indicating a disconnection of a first PDN associated with the APN and a linked default EPS bearer identity indicating a disconnection of a second PDN associated with the APN; and
    disconnecting the first PDN and the second PDN, if the linked default EPS bearer identity and the linked EPS bearer are belong to an APN; and
    disconnecting the first PDN, if the linked default EPS bearer identity and the linked EPS bearer are belong to different APNs.

16. The method of claim 15, further comprising:
    transmitting a deactivate request message representing the network apparatus disconnects the first PDN and the second PDN.

\* \* \* \* \*